Oct. 27, 1959     T. S. GATES     2,909,831
SHAVING CUTTER
Filed Oct. 3, 1955

INVENTOR.
THOMAS S. GATES
BY Whittemore,
Hulbert & Belknap
ATTORNEYS

United States Patent Office 2,909,831
Patented Oct. 27, 1959

2,909,831
SHAVING CUTTER

Thomas S. Gates, Grosse Pointe Woods, Mich., assignor to National Broach & Machine Company, Detroit, Mich., a corporation of Michigan Application October 3, 1955, Serial No. 537,949

2 Claims. (Cl. 29—103)

The present invention relates to a shaving cutter and more particularly, to a cutter of generally conical shape having tapered teeth.

It is an object of the present invention to provide a cutter as described in the preceding paragraph with concave conical surfaces at the bottoms of the tooth spaces and intersecting the lower portions of the teeth, such conical surfaces intersecting the sides of the teeth along straight lines extending parallel to the axis thereof.

More specifically, it is an object of the present invention to provide a shaving cutter in the form of a conical involute gear having surfaces at the corresponding sides of all teeth which are involute of the same base circle or cylinder, and concave conically formed undercut rearward slots provided at the bottom of the tooth spaces and the sides of the lower portions of the teeth, said slots intersecting the side surfaces of the teeth along lines parallel to the axis of the cutter and occupying an imaginary cylindrical surface.

It is a further object of the present invention to provide a cutter as described in the preceding paragraph in which the aforesaid imaginary cylindrical surface approximates the base cylinder of the tooth surfaces.

The foregoing permits the teeth to be serrated to substantially uniform depth from end to end in the most efficient manner.

Other objects and features of the invention will become apparent in the description proceeds, especially when taken in conjunction with the accompanying drawings, wherein.

Figure 3:
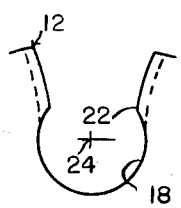
Figure 3 is a fragmentary elevational view of a portion of the cutter as seen from one side thereof, showing only the structure at the end of the cutter.

The present invention relates to cutters of generally conical form having the spaces between adjacent teeth extending progressively nearer the axis of the cutter from one side thereof to the other. Cutters of this type are useful in several applications, one of which is in shaving members having teeth of tapered thickness. A specific example of the present invention is the conical involute cutter illustrated in the figures. The cutter may be in the form of a conical involute gear. A gear of this type is characterized in the following particulars:

(1) Its teeth are tapered longitudinally from end to end.

(2) Its teeth, if the gear is in the form of a "spur gear" have tooth surfaces all of which are composed of involutes of the same base circle, or in other words, the gear may be said to have a base cylinder.

(3) The teeth, if the gear is in the form of a "helical gear," have tooth surfaces at the corresponding sides of all teeth which are involutes of the same base circle, but the surfaces at the opposite sides of all teeth are composed of involutes of a second and different base circle.

(4) Preferably, the tooth spaces between the gears extend to a point progressively closer to the axis of the gear from one side thereof to the other.

(5) Preferably, also, the outside diameter of the gear progressively varies from one side thereof to the other in conformity to the depth of tooth spaces, so that the toothed portions may be of approximately the same radial dimension from end to end. This however, is not a requirement and except to avoid possible interference, has no functional reason.

When the gear-like body is to be employed as a shaving cutter, the sides or flanks of its teeth are interrupted with laterally spaced grooves leaving ribs or lands therebetween. The side corners of these ribs or lands are sharp and constitute cutting edges when operated properly in conjunction with a mated toothed member.

Due to the general conical formation of the cutter teeth difficulty has been encountered in attempting to provide a smoothly rounded undercut surface at the lower portions of adjacent teeth. In accordance with the present invention this undercut surface is provided by an operation which comprises initially drilling a cylindrical surface and thereafter reaming the cylindrical surface into conical concave form in such a way as to provide an intersection between the conical concave slot or channel and the sides of the teeth along lines which are parallel to the axis of the cutter and which occupy an imaginary cylindrical surface. This imaginary cylindrical surface may be identical with the base cylinder of the involute surfaces of one or both sides of the teeth of the cutter, or it may have a larger diameter so that the entire teeth surfaces above the channel are involute.

Referring now to the drawings, a cutter constructed in accordance with the present invention is illustrated at 10 having a series of teeth 12 which are of tapered thickness being larger at one end as indicated at 14 than they are at the other end as indicated at 16. The space between adjacent pairs of teeth is a conical concave slot or channel as indicated at 18 and this surface intersects the sides 20 of the teeth along a line 22. In Figures 2–5 the axis of the conical surface 18 is illustrated at 24 and this axis is parallel to the axis of the cutter. Moreover, the axes 24 of all of the surfaces 18 extending around the cutter are at the same radial distance from the axis of the cutter and hence occupy an imaginary cylinder indicated at 28. The cone angle of the conical surfaces 18 is selected such that the lines 22, which are formed by the intersection of the concave conical surfaces 18 and the sides 20 of the teeth, are parallel to the axes 24 and hence to the axis of the cutter.

It was previously mentioned that the conical involute cutter has teeth the sides of which are all involutes of the same base circle or base cylinder, and in the preferred embodiment of the present invention the base cylinder is indicated in dot and dash lines at 30. It will be observed that this base circle is illustrated as lying within the imaginary cylindrical surface 31 containing the corners or lines 22.

Figure 2:
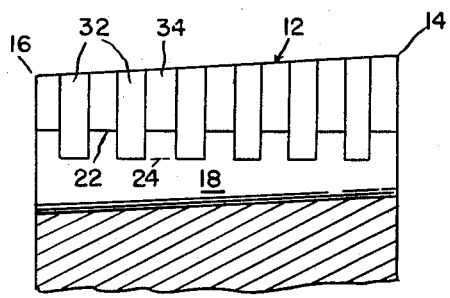
Figure 2 is an enlarged fragmentary sectional view on the line 2—2, Figure 1.
Figure 4:
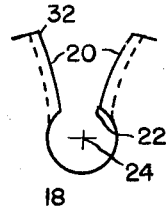
Figure 4 is a view similar to Figure 3 looking from the other side of the cutter.

It will also be observed by comparing Figures 2, 3 and 4 that while the general radial dimension of the tapered teeth is substantially equal from one end to the other, the active profile of the teeth varies from the large end to the smaller end. However, by providing for an intersection of the conical surfaces at a point substantially coincident with the trace of the base cylinder, all useful portions of the involute to the surfaces may be preserved.

Figures 1, 5:
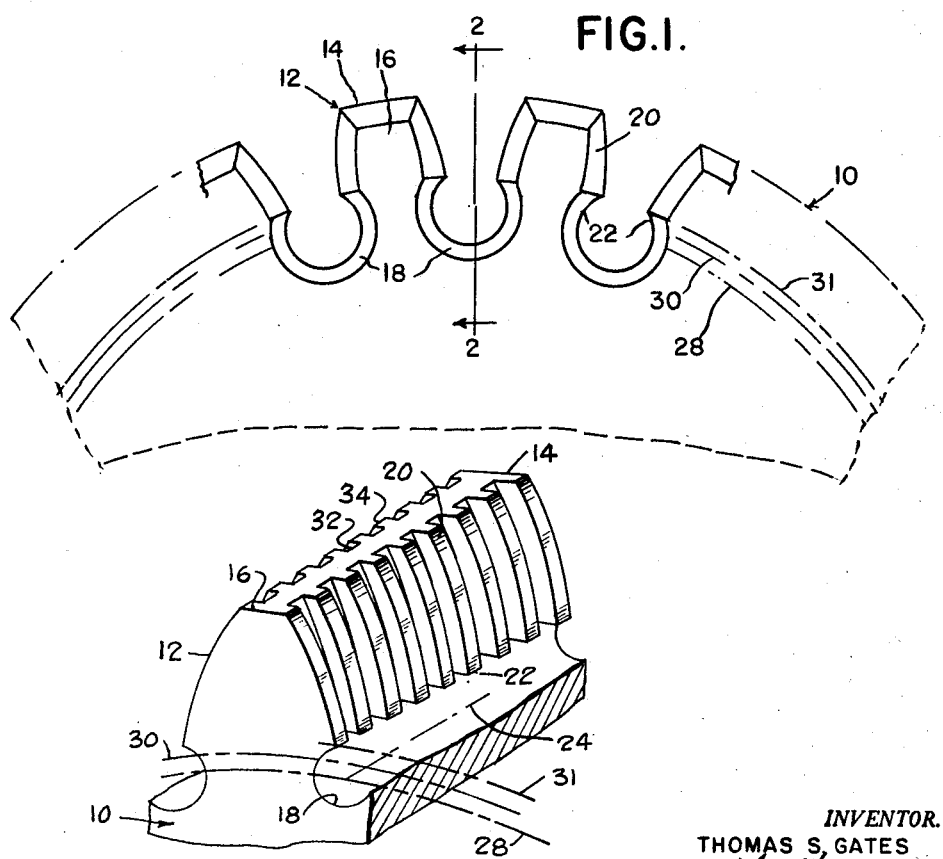
Figure 1 is a fragmentary side elevation of a cutter constructed in accordance with the present invention, with serrations omitted.
Figure 5 is a perspective view of a single tooth of a cutter.

In Figures 2 and 5 the grooves 32 and the ribs or lands 34 left between adjacent pairs of grooves are illustrated.

It will be observed in Figures 3 and 4 that the grooves 32 are continued to a depth which makes their bottom surfaces substantially tangent to the conical concave surface 18. This however, is not required and the grooves 32 may be of substantially less depth. However, it is preferred that they should not be of a greater depth, since the present arrangement permits the grooves to be provided by a tool which forms the bottom of the grooves to involute form and may be carried out by a planing type cutter which is adapted to come into clearance in the conical concave channel or slot 18. Accordingly, it is preferred to provide the reamed conical channel or slots prior to forming the grooves.

The drawings and the foregoing specification constitute a description of the improved shaving cutter in such full, clear, concise and exact terms as to enable any person skilled in the art to practice the invention, the scope of which is indicated by the appended claims.

What I claim as my invention is:

1. A shaving tool in the form of a gear having tooth spaces extending progressively closer to the axis from one end to the other, the bottoms of said tooth spaces and the adjacent lower side portions of the teeth of said gear defining a common conical concave surface intersecting the sides of said teeth along lines parallel to the axis of said cutter, and grooves formed in the sides of said teeth to leave ribs therebetween.

2. A shaving cutter in the form of a conical involute gear the teeth of which have involute flank surfaces generated from a base cylinder all elements of which are parallel to the axis of the tool, said teeth being of gradually varying thickness from one end to the other, the root surface between adjacent teeth being conical and of a cone angle selected such that its intersection with each flank of each tooth is located at a constant radial distance from the axis of the cutter from end to end of the tooth, the flanks of the teeth being interrupted by grooves extending from the tops of the teeth and intersecting the conically shaped root surface.

References Cited in the file of this patent

UNITED STATES PATENTS

| | | |
|---|---|---|
| 2,274,491 | Mentley | Feb. 24, 1942 |
| 2,278,737 | Praeg | Apr. 7, 1942 |
| 2,594,186 | Tourneau | Apr. 22, 1952 |

FOREIGN PATENTS

| | | |
|---|---|---|
| 672,022 | Great Britain | May 14, 1952 |
| 1,040,119 | France | May 20, 1953 |